US008192640B2

(12) United States Patent
Kim et al.

(10) Patent No.: US 8,192,640 B2
(45) Date of Patent: Jun. 5, 2012

(54) METHOD OF MANUFACTURING INK-JET HEAD

(75) Inventors: Sang-Jin Kim, Seoul (KR); Jae-Woo Joung, Suwon-si (KR); Pil-Joong Kang, Jinju-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 431 days.

(21) Appl. No.: 12/504,221

(22) Filed: Jul. 16, 2009

(65) Prior Publication Data

US 2010/0116783 A1 May 13, 2010

(30) Foreign Application Priority Data

Nov. 10, 2008 (KR) ........................ 10-2008-0111230

(51) Int. Cl.
*G01D 15/20* (2006.01)

(52) U.S. Cl. .............. 216/27; 216/39; 438/21; 438/691; 438/694; 438/700; 347/68

(58) Field of Classification Search ..................... 216/27
See application file for complete search history.

(56) References Cited

U.S. PATENT DOCUMENTS

| | | | | |
|---|---|---|---|---|
| 5,030,874 | A * | 7/1991 | Saito et al. | 310/334 |
| 7,266,868 | B2 * | 9/2007 | Sugahara | 29/25.35 |
| 2003/0025768 | A1 * | 2/2003 | Koike et al. | 347/68 |

FOREIGN PATENT DOCUMENTS

| | | | |
|---|---|---|---|
| JP | 6-134983 | | 5/1994 |
| JP | 06134983 | * | 5/1994 |
| JP | 11-334088 | | 12/1999 |
| JP | 2006-321060 | | 11/2006 |
| KR | 10-2005-0020743 | | 3/2005 |

OTHER PUBLICATIONS

Japanese Office Action, w/ partial English translation thereof, issued in Japanese Patent Application No. JP 2009-186794 dated May 17, 2011.

Korean Office Action issued in Korean Patent Application No. KR 10-2008-0111230 dated Dec. 30, 2010.

* cited by examiner

*Primary Examiner* — Lan Vinh
*Assistant Examiner* — Jiong-Ping Lu
(74) *Attorney, Agent, or Firm* — McDermott Will & Emery LLP

(57) ABSTRACT

A method of manufacturing an ink-jet head is disclosed. The method in accordance with an embodiment of the present invention includes: forming a dividing groove such that one surface of a piezoelectric element is divided corresponding to the position of the chamber; filling the dividing groove with a filler; bonding one surface of the piezoelectric element to one surface of the ink-jet head in which the chamber is formed; and polishing the other surface of the piezoelectric element such that the filler is exposed.

6 Claims, 11 Drawing Sheets

METHOD OF MANUFACTURING INK-JET HEAD

CROSS-REFERENCE TO RELATED APPLICATIONS

This application claims the benefit of Korean Patent Application No. 10-2008-0111230, filed with the Korean Intellectual Property Office on Nov. 10, 2008, the disclosure of which is incorporated herein by reference in its entirety.

BACKGROUND

1. Technical Field The present invention relates to a method of manufacturing an ink-jet head.

2. Description of the Related Art

Ink-jet printers can perform printing by converting an electrical signal to a physical force and ejecting ink droplets through a nozzle. An ink-jet head can be manufactured by processing various components such as a chamber, a restrictor, a nozzle, a piezoelectronic element, etc., on corresponding layers and bonding the layers with one another.

Recently, the ink-jet head is increasingly used not only in the conventional graphic ink-jet industry for printing on paper or fabric but also in the manufacture of electronic components, for example, a printed substrate and an LCD panel, etc.

As a result, the ink-jet printing technology for an electronic component that needs to discharge functional ink more correctly and precisely than the conventional graphic printing method requires functions that have not been required for the conventional ink-jet head. While the basic requirements stipulate the size and speed variation of discharged ink droplets, high density nozzles and high-frequency characteristics are also required for higher production.

In order to meet such requirements, the performance of a piezoelectric element, which is an actuator of the ink-jet head, needs to be improved urgently. In one of the methods of manufacturing the actuator of the ink-jet head, a powder-like piezoelectric element is mixed with a polymer binder at a certain ratio on a pre-sintered ceramic vibration plate to have viscosity, and then screen-printed, patterned and co-fired. In another method, the piezoelectric element is sintered after the piezoelectric element is patterned through the screen printing method, etc. on a vibration plate made of a material having a melting point higher than the sintering temperature of the piezoelectric element.

The actuator manufactured by the methods described above may have a deteriorated performance due to, for example, a defective pin hole inside the material and may be electrically disconnected when forming an upper and lower electrodes.

Additionally, such methods make it difficult to process the piezoelectric element functioning as an actuator to have a thickness of less than 100 um and cause the outer shape of the piezoelectric element to collapse. It is also difficult to align the piezoelectric element when bonding the piezoelectric element.

SUMMARY

The present invention provides a method of manufacturing an actuator of an ink-jet head that can be made thinner and less affected by crosstalk.

An aspect of the present invention features a method of manufacturing an ink-jet head including a plurality of chambers accommodating ink. The method in accordance with an embodiment of the present invention can include: forming a dividing groove such that one surface of a piezoelectric element is divided corresponding to the position of the chambers; filling the dividing groove with a filler; bonding one surface of the piezoelectric element to one surface of the ink-jet head in which the chambers are formed; and polishing the other surface of the piezoelectric element such that the filler is exposed.

The method can also include, before the bonding of the surfaces, forming a fixing groove on one surface of the ink-jet head such that the piezoelectric element is accommodated, and inserting the piezoelectric element into the fixing groove. The fixing groove can be formed by etching one surface of the ink-jet head. The one surface of the ink-jet head is made of a Silicon on Insulator (SOI) substrate, in which silicon is bonded to both sides of an oxide layer.

The method can also include removing the filler, after the polishing. The the filler can be removed by etching the filler.

The method can also include forming a conductive layer on one surface of the ink-jet head, before the bonding of the surfaces.

DETAILED DESCRIPTION

Figure 1:
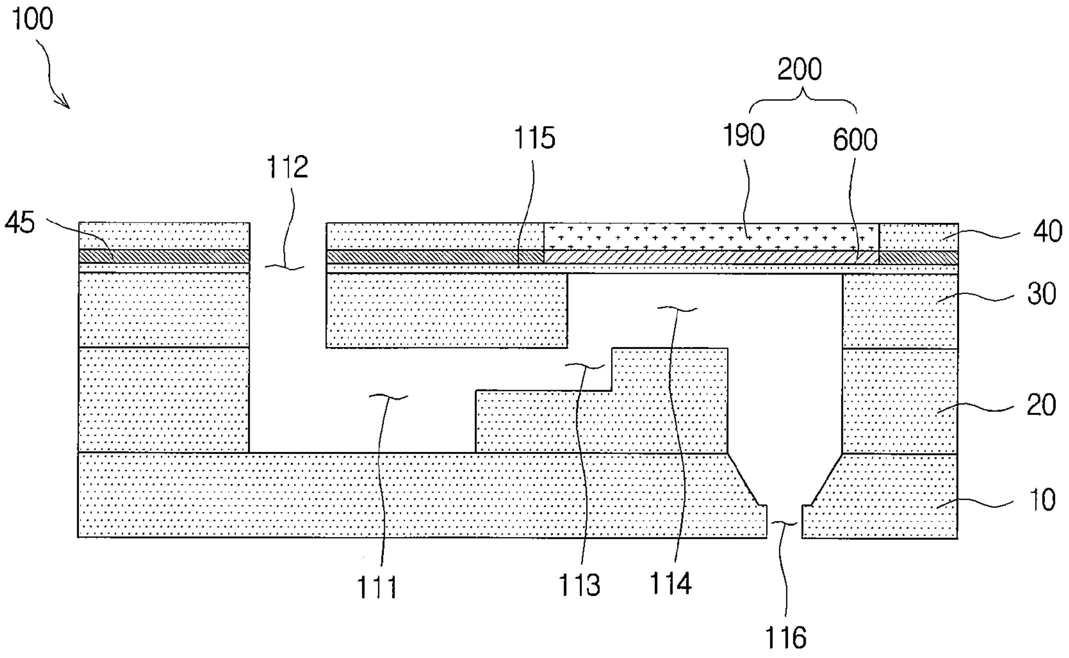
FIG. 1 is a cross-sectional side view of an ink-jet head according to an embodiment of the present invention.

Some of the characteristics and advantages of the present invention will become apparent through the following drawings and detailed description.

Hereinafter, a certain embodiment of a method of manufacturing an ink-jet head in accordance with the present invention will be described in detail with reference to the accompanying drawings. In description with reference to the accompanying drawings, the same reference numerals will be assigned to the same or corresponding elements, and repetitive descriptions thereof will be omitted.

FIG. 1 is a cross-sectional side view of an ink-jet head 100 according to an embodiment of the present invention. As shown in FIG. 1, the ink-jet head 100 can include a reservoir 111, a restrictor 113, a chamber 114, a membrane 115 and a nozzle 116.

The reservoir 111 accommodates ink and provides the ink to the chamber 114 through the restrictor 113, which will be described below. The reservoir 111 can be supplied with ink from the outside of the ink-jet head 100 through an inlet port 112. The inlet port 112 and the chamber 114 can be formed in a third plate 30. The reservoir 111 can be formed in a second plate 20.

The restrictor 113 links the reservoir 111 with the chamber 114, which will be described below, and is able to function as a channel for supplying the ink from the reservoir 111 to the chamber 114. The restrictor 113 and the reservoir 111 can be formed in the second plate 20.

The restrictor 113 is formed to have a smaller cross-section than the reservoir 111. When pressure is applied to the chamber 114 by a piezoelectric element 190, which will be described below, the restrictor 113 can control the flow of the ink that is supplied from the reservoir 111 to the chamber 114.

One side of the chamber 114 is connected with the restrictor 113, and the other side of the chamber 114 is connected with the nozzle 116. The chamber 114 is formed inside the ink-jet head 100 to accommodate the ink, and one side is covered with the membrane 115.

Figure 2:
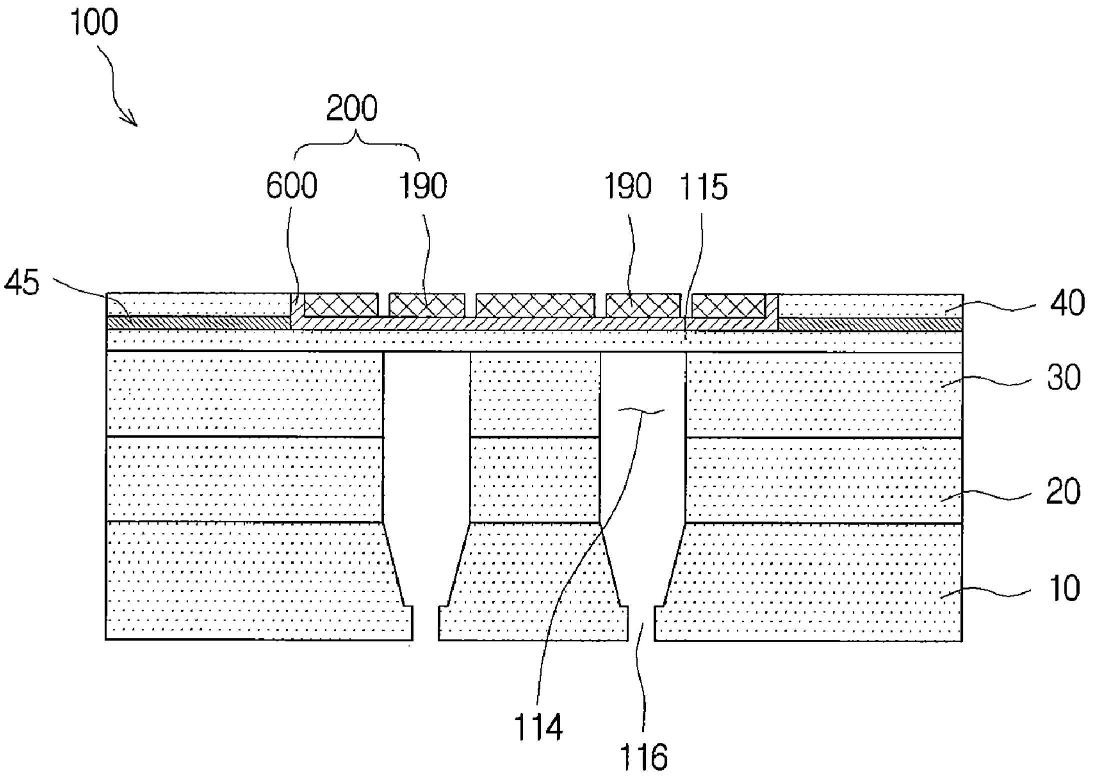
FIG. 2 is a cross-sectional front view of an ink-jet head according to an embodiment of the present invention.
Figure 3:
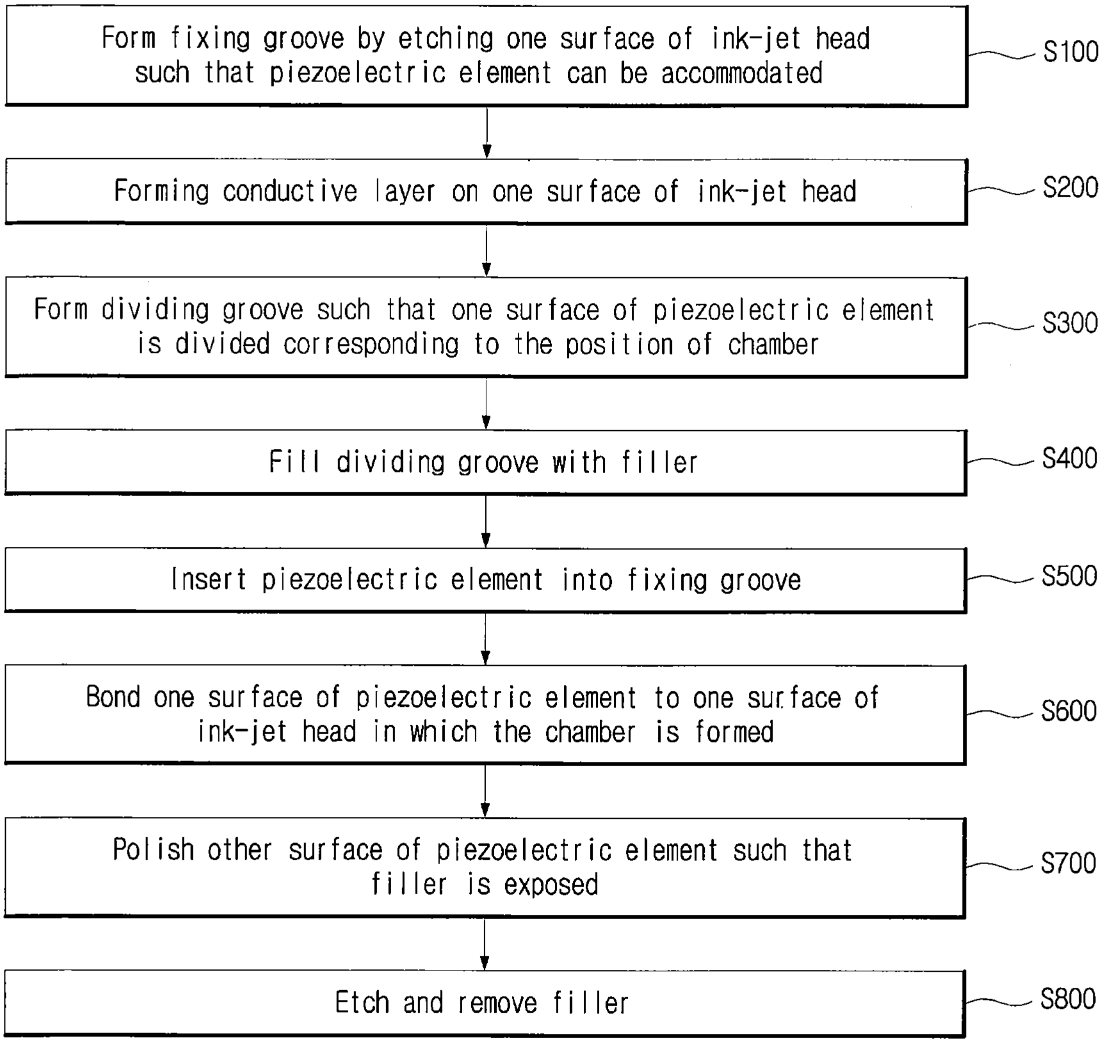
FIG. 3 is a flowchart showing a method of manufacturing an ink-jet head according to an embodiment of the present invention.

FIG. 2 is a cross-sectional front view of the ink-jet head 100 according to an embodiment of the present invention. As shown in FIG. 2, a plurality of ink-jet heads 100 can be formed lengthwise inside the ink-jet head 100.

Accordingly, the reservoir 111 described above can be extended in the lengthwise direction ro form a plurality of reservoirs, and Thus the restrictor 113 can be formed between each reservoir 111 and each chamber 114.

The nozzle 116 is coupled to the other side of each chamber 114 and can provide a path through which the ink accommodated in the chamber 114 is discharged outside the ink-jet head 100. The nozzle 116 can be formed on a first plate 10.

An actuator 190 can be coupled to one side of the ink-jet head 100, that is, an upper surface of the membrane 115, which corresponds to the position of the chamber 114. The actuator 190 generates vibration and transfers the vibration to the chamber 114 through the membrane 115, providing pressure to the chamber 114. The membrane 115 can be formed on a fourth plate 40.

An upper electrode (not shown) and a lower electrode 600 can be coupled to one side of the ink-jet head 100 in order to supply voltage to the piezoelectric element 190.

The ink-jet head 100 including the nozzle 116, the chamber 114, the restrictor 113 and the reservoir 114 described above can be formed by laminating the first plate 10, the second plate 20, the third plate 30 and the fourth plate 40, each of which has its own structure. The first plate 10, the second plate 20, the third plate 30 and the fourth plate 40 can be made of a silicon substrate. Hereinafter, a method for manufacturing the ink-jet head 100 according to an embodiment of the present invention will be described.

The method of manufacturing the ink-jet head 100 according to an embodiment of the present invention includes forming a fixing groove 500 by etching one surface of the ink-jet head 100 such that a piezoelectric element 700 can be accommodated (S100), forming a conductive layer 600 on one surface of the ink-jet head 100 (S200), forming a dividing groove 710 such that one surface of the piezoelectric element 700 is divided corresponding to the position of the chamber 114 (S300), filling the dividing groove 710 with a filler 712 (S400), inserting the piezoelectric element 700 into the fixing groove (S500), bonding one surface of the piezoelectric element 700 to one surface of the ink-jet head 100 in which the chamber 114 is formed (S600), polishing the other surface of the piezoelectric element 700 such that the filler 712 is exposed (S700) and etching and removing the filler (S800). Since the method enables the actuator 190 of the ink-jet head 100 to become thinner, the driving voltage of the ink-jet head 100 can be reduced and a frequency characteristic can be improved. In addition, since the ink-jet head 1000 having the actuator 190 is separated for each cell, it is possible to reduce the crosstalk and improve the discharge characteristic of the ink-jet head 100.

FIGS. 4 through 11 are cross-sectional views showing a part of the ink-jet head 100 according to an embodiment of the present invention. It shall be understood that the first plate 10 and the second plate 20 are omitted in FIGS. 4 through 11 for description of the present embodiment.

Figure 4:
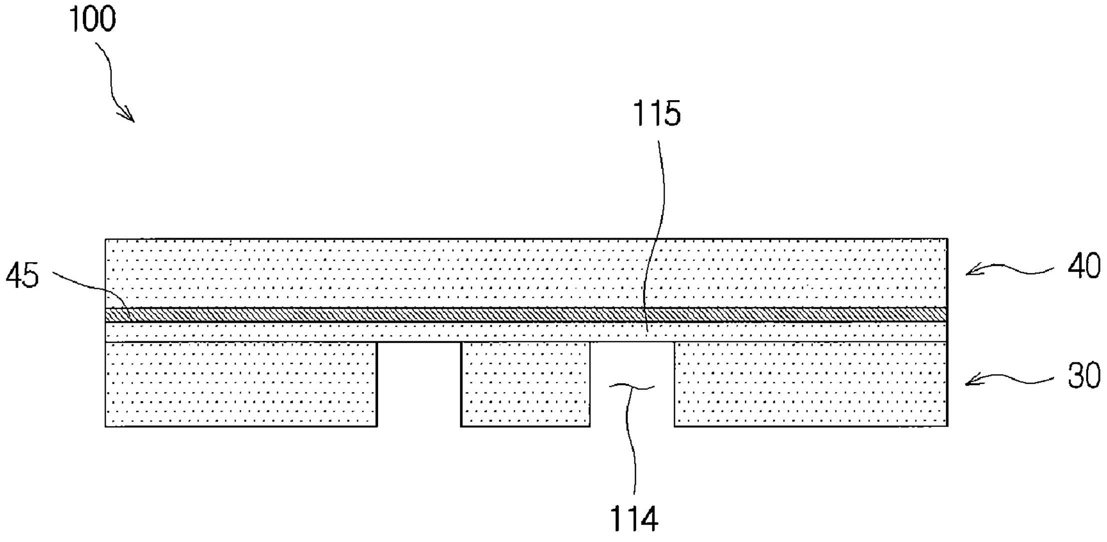
FIGS. 4 through 11 are cross-sectional views showing a part of an ink-jet head according to an embodiment of the present invention.

As shown in FIG. 4, in order to form the piezoelectric element 700, which is the actuator 190, the fourth plate 40 of the ink-jet head 100 can be made of an SOI substrate. The SOI substrate is manufactured by bonding silicon to both sides of an oxide layer 45 made of $SiO_2$.

The oxide layer 45 can be used as an etching stop layer, which can control the degree of etching during the etching and forming of the fixing groove 500, which will be described below. Therefore, the oxide layer 45 can be spaced by as much as the thickness of the membrane 115 from the lower surface of the SOI substrate.

Figure 5:
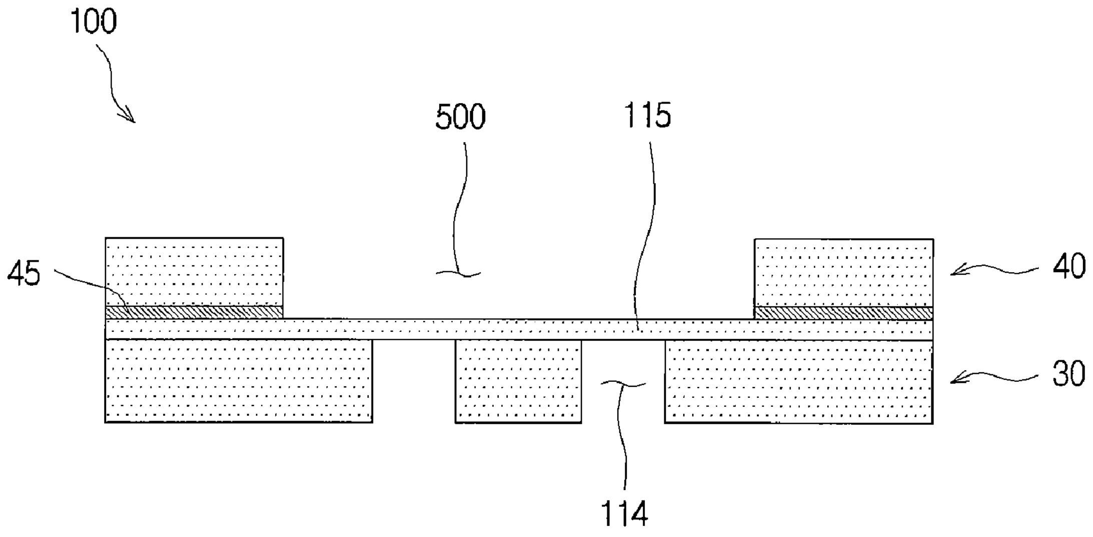

As shown in FIG. 5, the fixing groove 500 is first formed by etching one surface of the ink-jet head 100 such that the piezoelectric element is accommodated (S100). The fixing groove 50 can be a space for inserting the piezoelectric element 700. The piezoelectric element 700, which is inserted into the fixing groove 500, can easily maintain a certain positional relation with the ink-jet head 100.

Therefore, in the polishing of one surface of the ink-jet head 100, reliable polishing becomes possible to improve the polishing quality. Furthermore, since the polishing makes it easier to control the polishing thickness of the piezoelectric element 700, it is possible to make the actuator 190 thinner.

Since the fourth plate 40 is made of an SOI substrate on which the etching stop layer made of the oxide layer 45 is disposed, a uniform etched-surface can be obtained even for the etching stop layer by etching the fourth plate 40.

The membrane 115 is formed in an area of the fourth plate 40 corresponding to the position of the chamber 114 and remaining unetched. Therefore, the membrane 115 having a uniform thickness can be obtained by using the SOI substrate and there can be a constant distance between the actuator 190 and the chamber 114. As a result, the actuator 119 can be better aligned.

Figure 6:
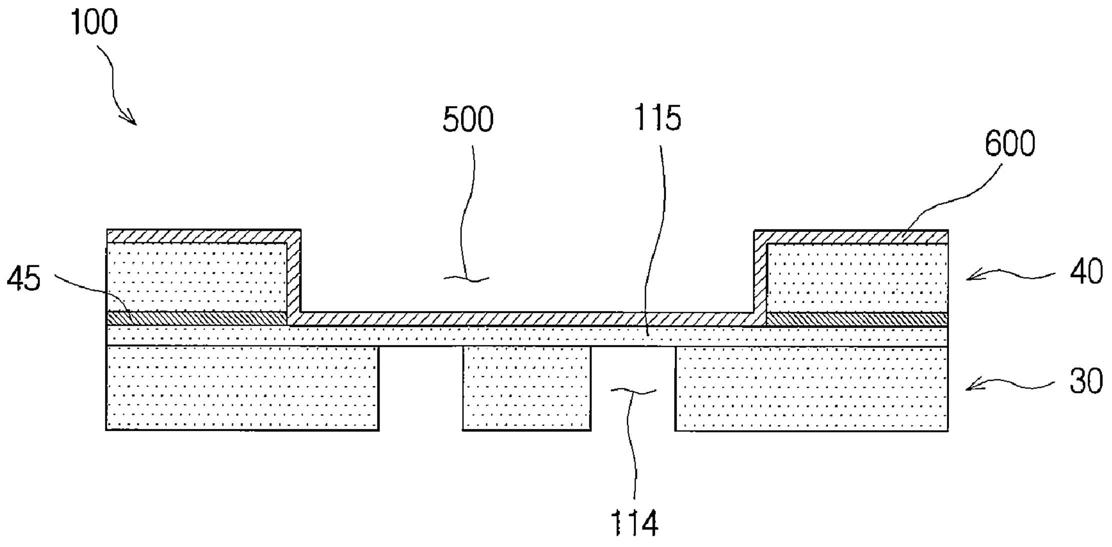

Next, as shown in FIG. 6, a conductive layer 600 is formed on one surface of the ink-jet head 100 (S200). The one surface of the ink-jet head 100 can be one surface of the fourth plate 40 in which the fixing groove 500 is formed. The conductive layer 600 can be formed by, for example, sputtering on one surface of the fourth plate 40. The conductive layer 600 is formed for electrically connecting to the actuator 190, and can be a lower electrode, which is used as a common electrode.

Figure 7:
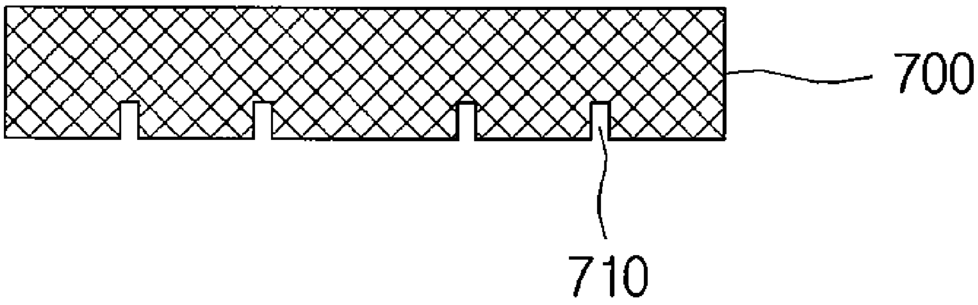

As shown in FIG. 7, the dividing groove 710 is formed such that one surface of the piezoelectric element 700 is divided corresponding to the position of the chamber 114 (S300). The piezoelectric element 700 can have a sintered bulk shape so as to have a certain shape.

The use of the bulk shaped piezoelectric element 700 in the method of manufacturing the inkjet head 100 according to an embodiment of the present invention can prevent the performance deterioration caused by the defect of a pin hole, etc., inside the piezoelectric element 700 during the process of performing the patterning and sintering of the piezoelectric element 700.

One surface of the piezoelectric element 700 can be inserted into the fixing groove 500 to face the membrane 115. The dividing groove 710 can be formed to divide the piezoelectric element 700 in correspondence with the position of the chamber 114. The dividing groove 710 can be variable types according to the position and shape of the chamber 114.

The dividing groove 710 has a depth that is greater than the thickness of the actuator 190 to be formed so as to separate adjacent actuators 190 from one another. The dividing groove 710 can be formed by a dicing process of mechanically cutting the one surface of the piezoelectric element 700.

Figure 8:
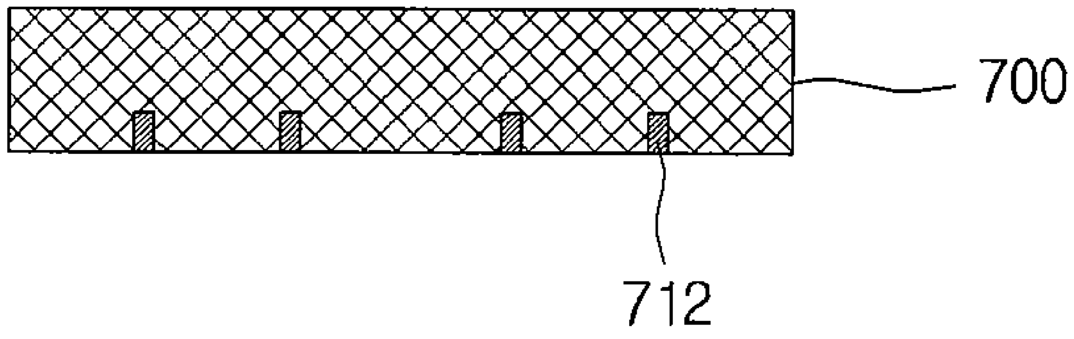

As shown in FIG. 8, the dividing groove 710 is filled with a filler 712 (S400). The filler 712 can prevent impurity from being inserted into the dividing groove 710 during the manufacturing of the ink-jet head 100. Particularly, when the piezoelectric element 700 is bonded to the dividing groove 710, the filler 712 can prevent an adhesive, which is interposed between the piezoelectric element 700 and the dividing groove 710, from being filled in the dividing groove 710.

The filler 712 can be in the form of powder and can be mixed with a binder and coated on one surface of the piezoelectric element 700 to fill the dividing groove 710. Then, the filler 712 that remains on one surface of the piezoelectric element 700 without being filled is removed. Then, the filler 712 filled in the dividing groove 710 is hardened. The filler 712 can be made of a material such as polymer.

Figure 9:
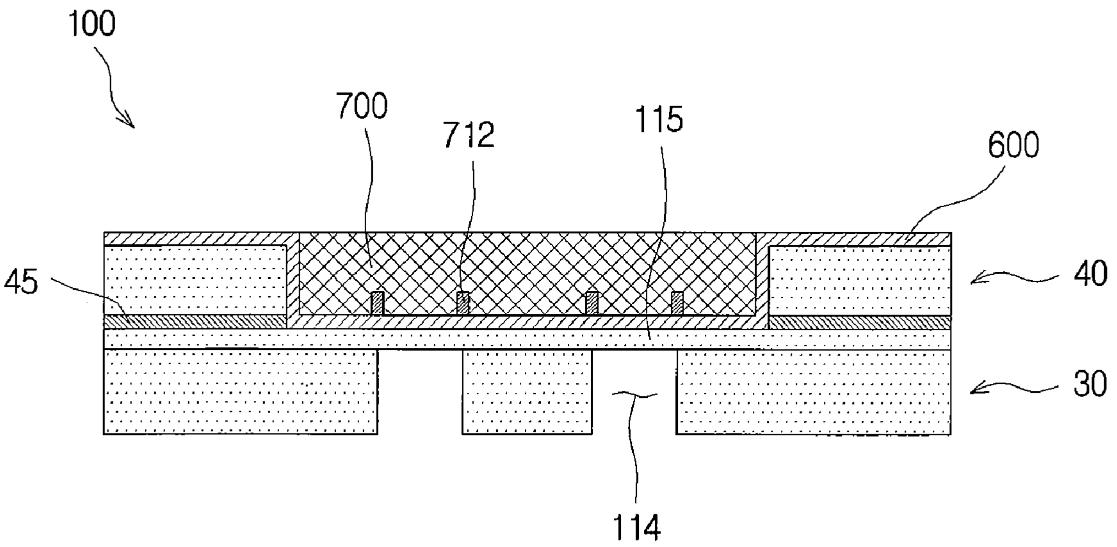

As shown in FIG. 9, the piezoelectric element 700 is inserted into the fixing groove 500 (S500) such that one surface of the piezoelectric element 700, in which the dividing groove 710 is formed, faces the basal surface of the fixing groove 500.

Next, one surface of the piezoelectric element 700 is bonded to the one surface of the ink-jet head 100, in which the chamber 114 is formed (S600). The one surface of the ink-jet head 100 is made of the fourth plate 40. As a result, the piezoelectric element 700 can be bonded to the fourth plate 40. The piezoelectric element 700 can be bonded to the fourth plate 40 by using an adhesive. In this case, a step can be added to coat the adhesive on the fixing groove 500 before the described piezoelectric element 700 is inserted into the fixing groove 500.

Figure 10:
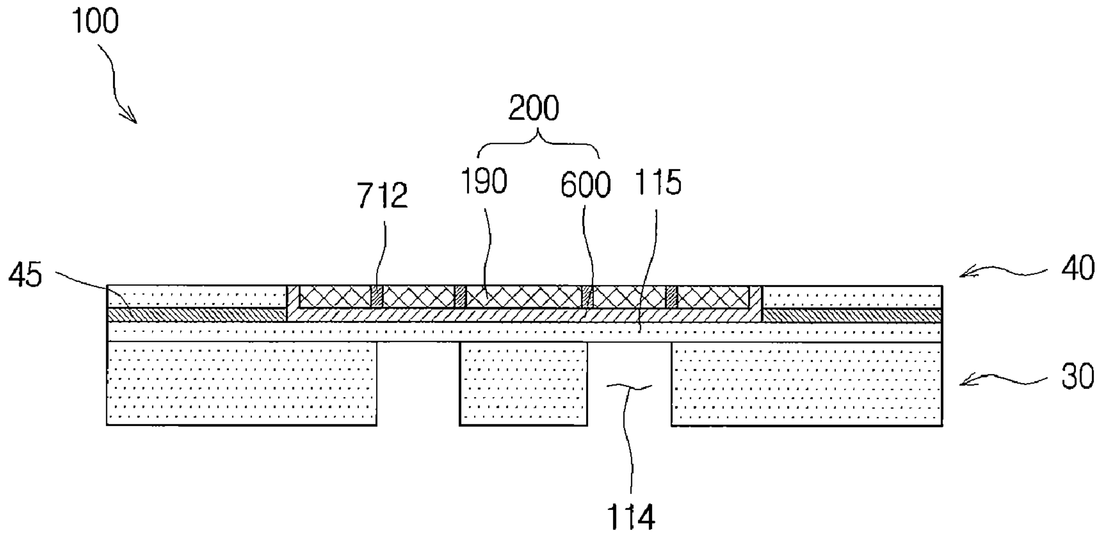

As shown in FIG. 10, the other surface of the piezoelectric element 700 is polished such that the filler 712 is exposed (S700). Since the dividing groove 710 is formed in one surface of the piezoelectric element 700 and the dividing groove 710 is filled with the filler 712, the actuator 190 can be divided by polishing the other surface of the piezoelectric element 700 such that the filler 712 is exposed.

The coating of the other surface of the piezoelectric element 700 can be performed on the entire one surface of the ink-jet head 100, in which the fixing groove 500 is formed. Since the piezoelectric element 700 has been inserted into the fixing groove 500, it is possible to easily maintain the alignment of the piezoelectric element 700 during the polishing process. Additionally, the outer shape of the piezoelectric element 700 inserted into the fixing groove 500 can be prevented from being collapsed during the polishing process, thereby preventing the performance deterioration of the actuator 190.

In addition, the actuator 190 can be formed by polishing and dividing the bulk shaped piezoelectric element 700. By doing this, it is easier to control the thickness of the actuator 190 and make the actuator 190 thinner.

Figure 11:
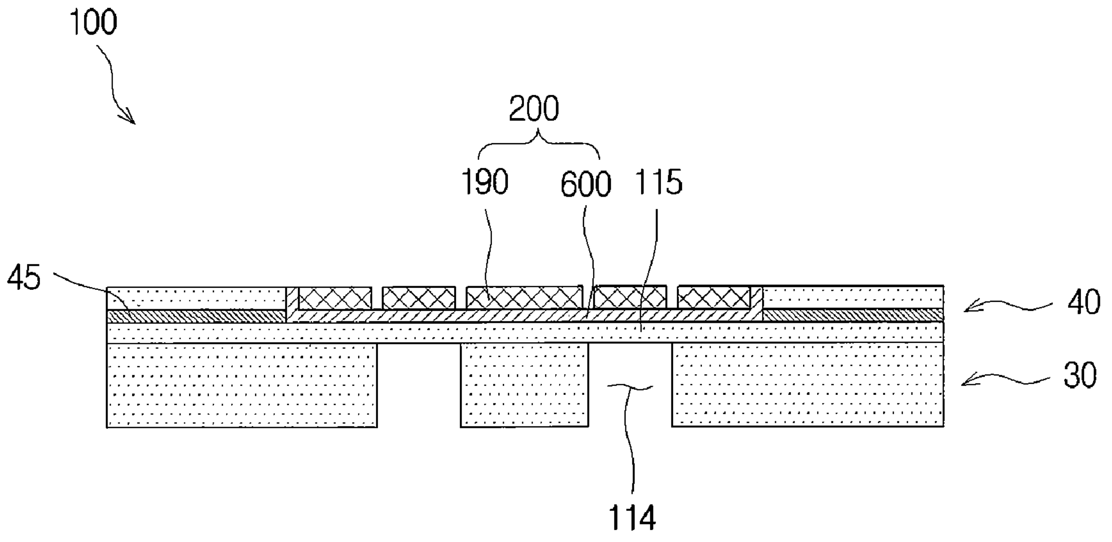

As shown in FIG. 11, the filler 712 is etched off and removed (S800). An etching solution corresponding to the filler 712 is coated on one surface of the ink-jet head 100 to perform the etching of the filler 712. When the filler 712 between the actuators 190 is removed, the actuators 190 are physically divided from one another. Thus, it is possible to prevent any crosstalk caused by the operation of an adjacent actuator.

Meanwhile, when a material having an excellent damping performance is used as the filler 712, the filler 712 can absorb the vibration of the adjacent actuator 190 and reduce the crosstalk. In this case, the removing of the filler 712 can be omitted, thereby remaining the filler 712 between the actuators 190 and allowing the filler 712 function as a damper.

While the present invention has been described with reference to a particular embodiment, it shall be understood by those skilled in the art that various changes and modification in forms and details can be made without departing from the spirit and scope of the present invention as defined by the appended claims.

What is claimed is:

1. A method of manufacturing an ink-jet head comprising a plurality of chambers accommodating ink, the method comprising steps of:

forming a dividing groove such that one surface of a piezoelectric element is divided corresponding to the position of the chambers;

filling the dividing groove with a filler;

forming a fixing groove on one surface of the ink-jet head such that the piezoelectric element is accommodated;

inserting the piezoelectric element into the fixing groove;

bonding one surface of the piezoelectric element to the fixing groove of the ink-jet head in which the chambers are formed; and polishing the other surface of the piezoelectric element and the one surface of the ink-jet head such that the filler is exposed.

2. The method of claim 1, wherein the forming of the fixing groove is performed by etching one surface of the ink jet head.

3. The method of claim 2, wherein the one surface of the ink-jet head is made of a Silicon on Insulator (SOI) substrate, in which silicon is bonded to both sides of an oxide layer.

4. The method of claim 1, further comprising removing the filler, after the polishing.

5. The method of claim 4, wherein the removing of the filler is performed by etching the filler.

6. The method of claim 1, further comprising forming a conductive layer on one surface of the ink-jet head, before the bonding of the surfaces.

* * * * *